June 1, 1926.
W. A. ANTILOTTI
VEHICLE WHEEL
Filed Feb. 23, 1921
1,586,955
2 Sheets-Sheet 1
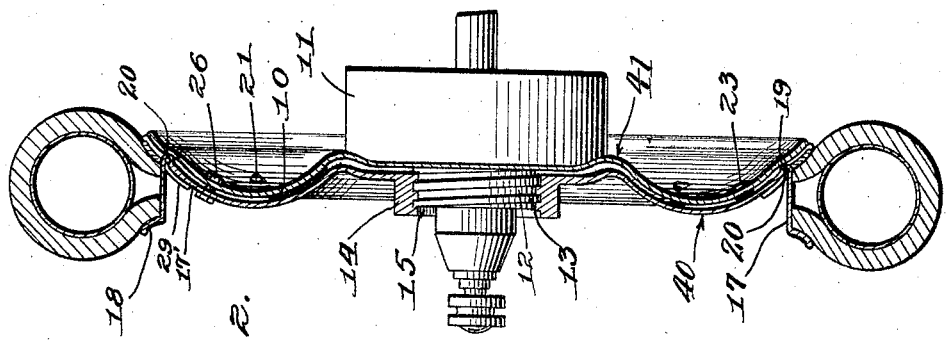
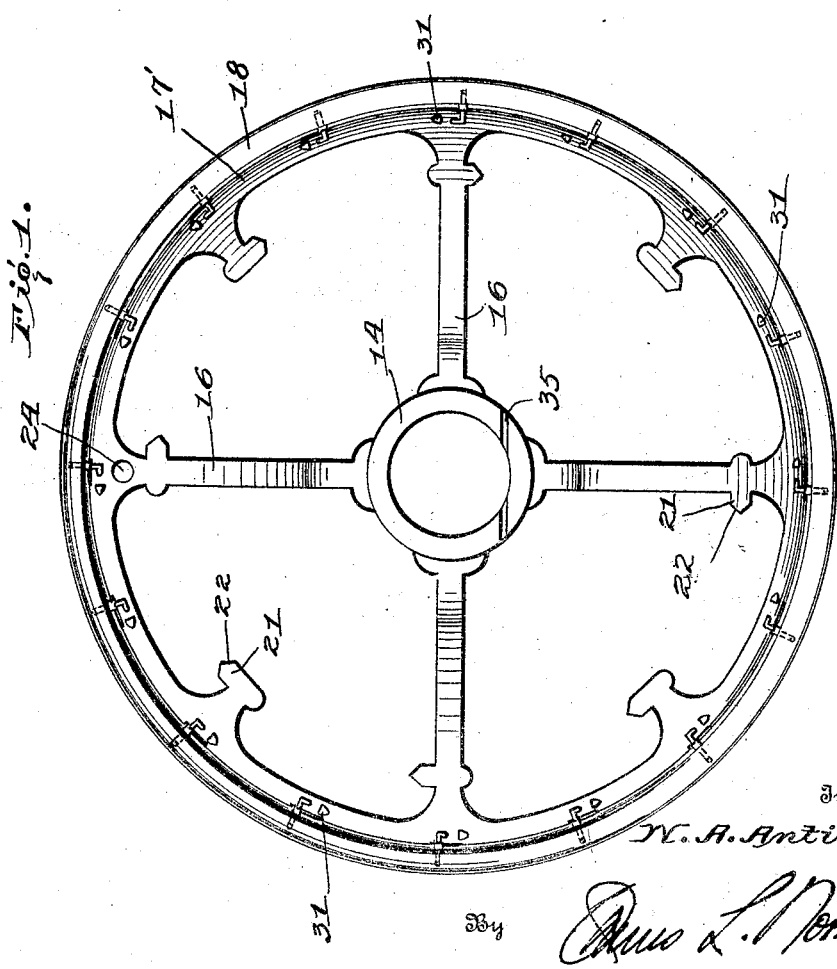
Inventor
W. A. Antilotti.
By
Attorney June 1, 1926.
W. A. ANTILOTTI
1,586,955
VEHICLE WHEEL
Filed Feb. 23, 1921    2 Sheets-Sheet 2
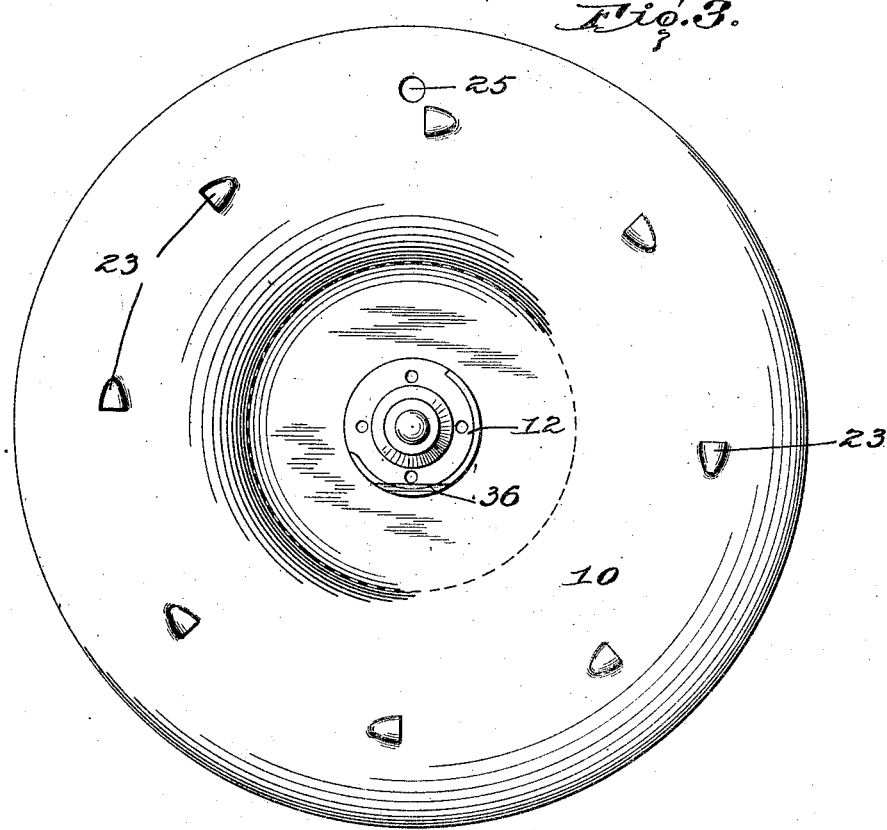
Inventor
W. A. Antilotti.

Patented June 1, 1926.

1,586,955

UNITED STATES PATENT OFFICE.

WILLIAM A. ANTILOTTI, OF ATLANTA, GEORGIA, ASSIGNOR OF ONE-HALF TO EDGAR C. JONES, OF ATLANTA, GEORGIA.

VEHICLE WHEEL.

Application filed February 23, 1921. Serial No. 447,164.

This invention relates to vehicle wheels having demountable rims and more particularly to wheels of the solid disk type having separable sections.

The object of the invention is to provide an auxiliary wheel section which may be readily assembled to the main section. The tire may also be carried on the auxiliary section in inflated condition so that an inflated tire may be exchanged for a damaged tire by merely replacing the auxiliary section carrying the damaged tire by the auxiliary section carrying the spare tire.

A further object of my invention is to transmit the load through a metallic disk wheel of such shape as to permit the resiliency of the metal to be effective in affording easy riding conditions and reducing wear upon the tires of the vehicle.

Other objects of the invention attained by novel features of construction and arrangement of parts will become apparent on reference to the following specification which describes the invention in connection with the accompanying drawings.

In the drawings:—

Figure 1 is a side elevation of the auxiliary wheel section showing the pivotally mounted keepers.

Figure 2 is a vertical sectional view showing the main and auxiliary wheel sections in assembled position.

Figure 3 is a side elevation of the main disk wheel section, the auxiliary wheel section being removed.

Referring now in detail to the several figures, the numeral 10 designates a disk section having on one side thereof a brake-drum 11 and on its opposite side, in coaxial relation to said drum, a hub 12, on the former of which the brake may act and the latter having screw threads 13 formed thereon. The auxiliary wheel section constituting an important feature of my invention comprises a hub engaging sleeve 14 having internal screw threads 15 adapted to engage the above mentioned threads 13. A plurality of curved spokes 16 radiate from the hub-engaging sleeve 14 and form a spider which supports the rim 17, the latter having an upstanding flange 18 on the outer side thereof. The rim 17 extends at an angle from a web portion 17' of the auxiliary wheel section and the two are connected by a curved part 19 in which is inserted a ring preferably in the form of an iron or steel rod 20 of cylindrical cross-section. The metal is bent over sufficiently at the portion 19 so that the rod 20 may be retained in place.

Lugs 21 having tapered or cone shaped forward ends 22 are mounted on the spokes 16 and on the web portion 17' intermediate said spokes for the purpose of engaging pockets 23 struck up from the material of the disk section 10. The pockets 23 are so positioned that, when the hub engaging sleeve 14 of the auxiliary wheel section is screwed upon the hub 12 of the disk section, said lugs will engage in the pockets 23 when the auxiliary and disk sections are coming into firm contact. An aperture 24 formed through the auxiliary wheel preferably through one of the spokes 16 as shown in Figure 1 is adapted to register with a corresponding aperture 25, Fig. 3, in the disk section 10 and a bolt 26 is inserted through these registering apertures in order to lock the disk and auxiliary wheel sections in assembled relation with the lugs 21 in the pockets 23 as above described.

It will be noted that the pressed metallic disk section 10 is given an annularly corrugated shape as shown at 40 and 41 in Figure 2 for the purpose of obtaining resilient action in that the weight is transferred from the auxiliary wheel section to the disk section principally at the pockets 23 and only partially at the hub engaging sleeve 14. The dished shape portion of the disk section thereby acts in much the same manner as a spring and gives much easier riding conditions than are afforded by a straight disk wheel.

Operation of loop 39 outwardly will release wire 37 from the registering grooves while movement of loop 39 toward the auxiliary wheel section will bind the wire in said grooves.

If it is desired to assemble a tire upon the rim, the auxiliary wheel section is first detached from the disk section by simply removing the bolt 26 and unscrewing the hub engaging sleeve 14.

Modifications may occur to those skilled in the art to which this invention appertains, but it is my desire to include within the purview of my invention all such modifications and changes as fall within the scope of the appended claim.

Having described my invention, what I claim as new and desire to secure by Letters Patent, is:—

A vehicle wheel comprising a disk section including a hub and a disk extending outwardly therefrom, an auxiliary section including a rim and a spider extending inwardly therefrom, said web and disk nesting together with the latter terminating adjacent said rim, means carried by said spider for engaging the hub, and interengaging means on said spider and disk adjacent the peripheral parts thereof for detachably securing the disk and auxiliary sections together.

In testimony whereof I have hereunto set my hand.

WILLIAM A. ANTILOTTI.